United States Patent [19]

Shiba et al.

[11] Patent Number: 5,018,039
[45] Date of Patent: May 21, 1991

[54] DISC CARTRIDGE WITH THICK PORTION SURROUNDING HEAD INSERTION HOLE

[75] Inventors: Haruo Shiba; Masaru Ikebe, both of Komoro; Morimasa Sasaki, Saku, all of Japan

[73] Assignee: TDK Corporation, Tokyo, Japan

[21] Appl. No.: 367,308

[22] Filed: Jun. 16, 1989

[30] Foreign Application Priority Data

Jun. 17, 1988 [JP] Japan .............................. 63-79489[U]

[51] Int. Cl.⁵ .......................................... G11B 23/033
[52] U.S. Cl. .................................................... 360/133
[58] Field of Search ............................. 360/133, 99.01; 204/444; 369/291

[56] References Cited

U.S. PATENT DOCUMENTS

| 4,272,793 | 6/1981 | Van Landingham | 360/133 |
| 4,660,117 | 4/1987 | Carey et al. | 360/133 |
| 4,814,926 | 3/1989 | Gulbrandsen | 360/133 |

*Primary Examiner*—David J. Severin
*Attorney, Agent, or Firm*—Price, Gess & Ubell

[57] ABSTRACT

A disc cartridge capable of preventing entering of dust into a casing and ensuring a stable and positive operation without damaging a disc while satisfactorily exhibiting a cleaning effect and keeping proper contact between a recording head and the disc. A casing is provided thereon with a slide area which is formed by a slide area defining section of the casing. The slide area is formed with at least one head inserting hole. The slide area defining section is provided on an inner surface thereof with at least one thick-walled portion in a manner to extend along a whole periphery of a portion of the head inserting hole overlapping a sheet-like liner and inwardly project from the inner surface of the casing, so that the liner may be pressed against the disc at a force of a constant level over a wide area of the disc and block a communication between an exterior of the cartridge and its interior through the head inserting hole.

5 Claims, 4 Drawing Sheets

FIG.3
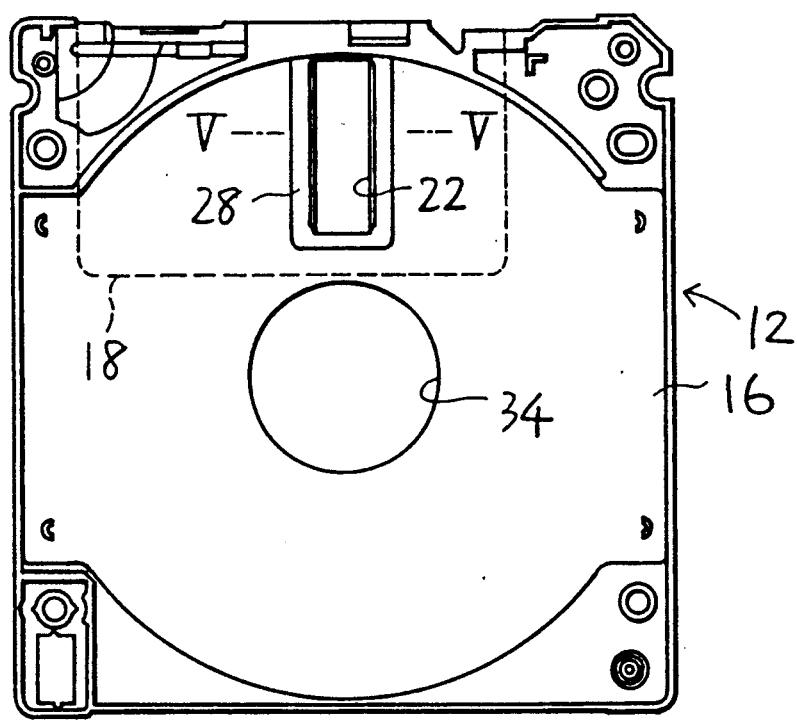
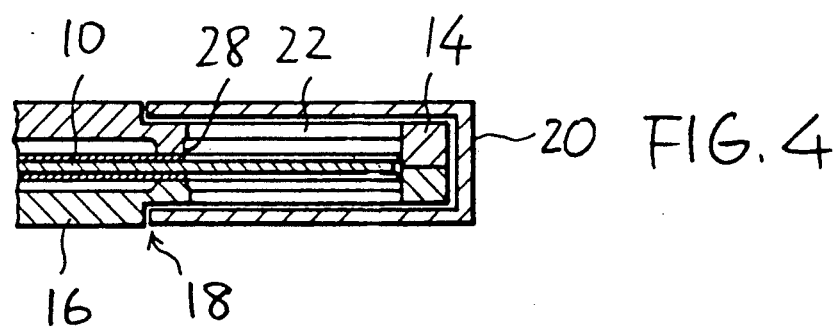
FIG.4
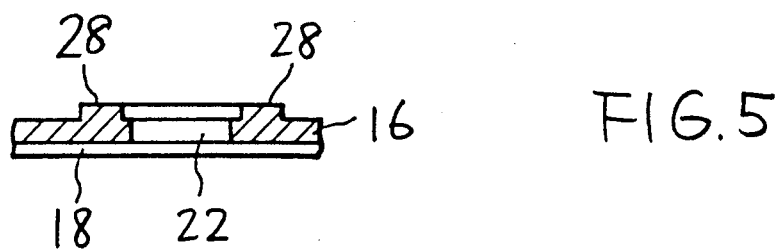
FIG.5

DISC CARTRIDGE WITH THICK PORTION SURROUNDING HEAD INSERTION HOLE

BACKGROUND OF THE INVENTION

1. Field of the Invention

This invention relates to a disc cartridge, and more particularly to a disc cartridge which is adapted to rotatably receive a disc-like medium such as a magnetic disc, a floppy disc, a hard disc, a cleaning disc, an optical disc, a photo-magnetic disc or the like therein for recording and/or reproducing.

2. Description of the Prior Art

In general, a conventional disc cartridge is so constructed that a floppy disc, a compact disc, a video disc or the like used for a digital-data storing unit, a video unit or the like is rotatably received in a casing for protection against damage and dust to assure its safety in both use and non-use. Also, in the conventional disc cartridge, the casing is provided on each of upper and lower inner surfaces thereof with a sheet-like liner so as to be contacted with a surface of the disc.

In the conventional disc cartridge, a recess provided on each of the upper and lower inner surfaces of the casing for constituting a disc receiving section is formed into a substantially flat shape and is provided thereon with elongated projection-like ribs, which serve to pressedly contact the liner with the surface of the disc.

Such construction of the conventional disc cartridge causes the disc to be locally pressed by means of the elongated projection-like ribs, so that the disc and liners may be substantially damaged, resulting in an cleaning effect of the liner and a satisfactory contact of the liner with the disc being deteriorated, as well as the disc being unserviceable.

Further, in the conventional disc cartridge, a portion of a casing on which a slide area is defined is substantially reduced in thickness when a shutter is made of a plastic material, because formation of a shutter by a plastic material requires to significantly increase a thickness of the shutter for ensuring its rigidity and smooth operation. Unfortunately, this leads to deterioration of formability and/or workability of the casing.

Such disadvantages as described above are somewhat eliminated by techniques disclosed in Japanese Utility Model Publication No. 44540/1982, Japanese Utility Model Application Laying-Open Publication No. 201667/1982, Japanese Utility Model Application Laying-Open Publication No. 201669/1982 or Japanese Utility Model Application No. 93872/1986.

Unfortunately, the techniques disclosed fail to effectively prevent entrance of a foreign matter such as dust, moisture or the like into the casing by suction due to rotation of a disc in use, because they cannot block a communication between an exterior of a cartridge and its interior through a head inserting hole. Also, they fail to provide a casing, particularly, a portion of the casing on which a slider is movably fitted with rigidity sufficient to fully prevent any deformation of the portion. Further, the techniques cause insufficient cleaning, resulting in dust often remaining on a disc.

Thus, the conventional disc cartridge is highly deteriorated in durability and reliability.

Accordingly, it would be highly desirable to develop a disc cartridge which is capable of ensuring safety of both a disc and a casing in both use and non-use to permit the cartridge to exhibit satisfactory durability and reliability.

SUMMARY OF THE INVENTION

Generally speaking, in accordance with the present invention, a disc cartridge is provided. The disc cartridge includes a disc and a casing in which the disc is rotatably received. The casing is provided thereon with a slide area which is formed by a slide area defining section of the casing including an upper and lower surfaces of the casing. Also, the disc cartridge includes at least one sheet-like liner arranged in the casing in a manner to be interposed between an inner surface of the casing and the disc. The casing is provided thereon with a slide area which is formed by a slide area defining section of the casing including an upper and lower surface of the casing. The slide area is formed with at least one recording and/or reproducing head inserting hole. The disc cartridge also includes a shutter slidably fitted on the slide area defining section of the casing so as to be slid over the slide area for operating the head inserting hole. The slide area defining section is provided on an inner surface thereof with at least one thick-walled portion in a manner to extend along a substantially whole periphery of a portion of the head inserting hole overlapping the liner and inwardly project from the inner surface.

In a preferred embodiment of the present invention, the thick-walled portion is formed into a frame-like shape of a suitable width.

In a preferred embodiment of the present invention, the thick-walled portion is provided so as to extend in a radial direction of the disc by a distance sufficient to cover a region of the disc between an innermost periphery of a recording section of the disc and its outermost periphery.

Alternatively, the thick-walled portion is formed in a manner to extend substantially over the slide area.

Accordingly, it is an object of the present invention to provide a disc cartridge which is capable of ensuring its stable and positive operation over extended periods of time.

It is another object of the present invention to provide a disc cartridge which is capable of highly improving not only its endurance but its reliability in operation.

It is another object of the present invention to provide a disc cartridge which is capable of substantially preventing entering of a foreign matter into the cartridge in use.

It is a further object of the present invention to provide a disc cartridge which is capable of exhibiting an effective cleaning effect and keeping satisfactory contact between a recording and/or reproducing head and a disc.

It is still another object of the present invention to provide a disc cartridge which is capable of effectively preventing damage of a disc.

It is yet another object of the present invention to provide a disc cartridge which is capable of positively preventing deterioration of formability of the casing, particularly, its slide area and a decrease in rigidity of the casing, even when the shutter is formed into a thick wall.

It is still a further object of the present invention to provide a disc cartridge which is capable of accomplishing the above-described objects with a simple structure and at a low cost.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein

FIG. 3 is a plan view showing a lower casing member;

FIG. 4 is an enlarged vertical sectional view taken along line IV—IV of FIG. 1;

FIG. 5 is a sectional view taken along line V—V of FIG. 3;

DETAILED DESCRIPTION OF THE PREFERRED EMBODIMENT

Figure 1:
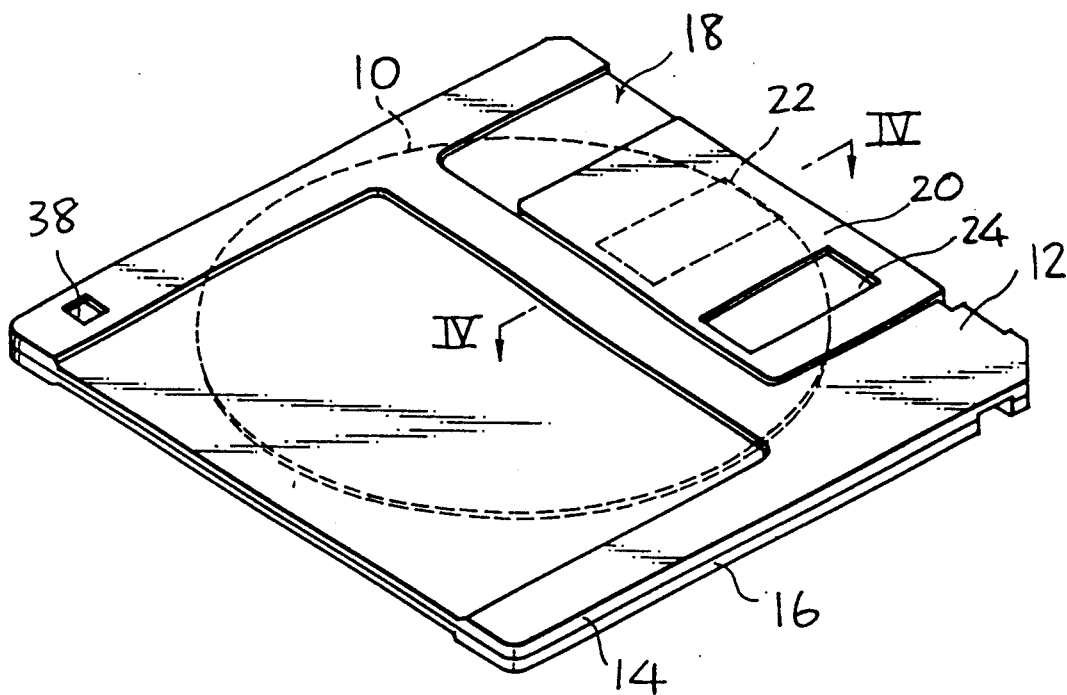
FIG. 1 is a perspective view showing an embodiment of a disc cartridge according to the present invention.
Figure 2:
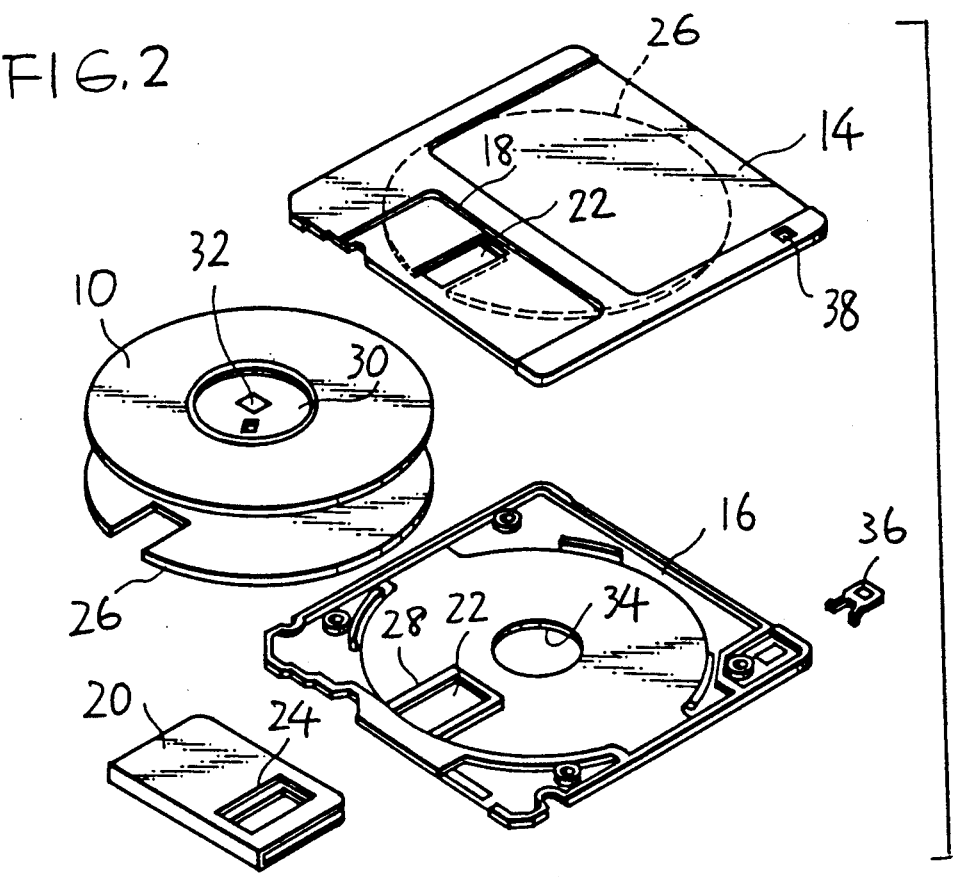
FIG. 2 is an exploded perspective view of the disc cartridge shown in FIG. 1.

Now, a disc cartridge according to the present invention will be described hereinafter with reference to the accompanying drawings.

The following description will be made in connection with a floppy disc cartridge, however, it is a matter of course that the present invention is not limited to such a floppy disc cartridge.

FIGS. 1 to 5 illustrate a floppy disc cartridge which is an embodiment of a disc cartridge according to the present invention.

A floppy disc cartridge of the illustrated embodiment generally includes a floppy disc 10 serving as a recording and/or reproducing disc medium and a casing 12 for rotatably receiving the floppy disc 10 therein. The casing 12 comprises an upper casing member 14 and a lower casing member 16, which are joined together to define a disc receiving space in the casing. The casing 12 is provided thereon with a slide area 18 which is adapted to permit a shutter 20 fitted thereon to be slidably moved over a range of the slide area. The slide area 18 is defined on the casing 12 by a slide area defining section of the casing 12 including a part of upper and lower surfaces of the casing 12. In the illustrated embodiment, the slide area defining section of the casing 12 includes a part of the upper casing member 14 and a part of the lower casing member 16 which are interconnected through a side wall of the casing 12.

The slide area 18 is formed with at least one recording and/or reproducing head inserting hole or aperture 22. In the illustrated embodiment, the head inserting hole 22 is provided on each of the upper and lower casing members 14 and 16.

The shutter 20 is actuated for operating the head inserting hole 22. For this purpose, the shutter 20 is formed into a U-shape so as to be fitted on the slide area defining section of the casing 12 and slid over the slide area 18. Also, the shutter 20 is provided with apertures 24 so as to correspond to the head inserting holes 22.

The disc cartridge of the illustrated embodiment also includes at least one sheet-like liner 26 arranged in the casing 12 in a manner to be interposed between an inner surface of at least one of the casing members 14 and 16 and the disc 10. In the illustrated embodiment, the sheet-like liner 26 is arranged between the disc 10 and each of the upper and lower casing members 14 and 16.

The above-described slide area defining section including the upper and lower casing members 14 and 16 is formed on an inner surface thereof with at least one thick-walled portion 28 in a manner to extend along a whole periphery of a portion of the head inserting hole 22 overlapping the sheet-like liner 26 and inwardly project from the inner surface of the slide area defining section, so that the sheet-like liner 26 may be pressedly contacted with the disc 10 more uniformly through the thick-walled portion 28 and the slide area defining section is provided with more satisfactory rigidity by the thick-walled portion 28. In the embodiment, the thick-walled portion 28 is provided on each of the upper and lower casing members 14 and 16.

In the Illustrated embodiment, the thick-walled portion 28 is formed into a frame-like shape of a suitable width. In the illustrated embodiment, as clearly shown in FIG. 3, the thick-walled portion 28 is preferably provided so as to extend in a radial direction of the disc 10 by a distance sufficient to cover a region of the disc 10 between an innermost periphery of a recording section of the disc and its outermost periphery.

The disc 10 includes a center core 30 at which a central hole 32 is formed. Reference numeral 34 designate central aperture, 36 is a miserase preventing plug, and 40 is a positioning hole.

As can be seen from the foregoing, in the disc cartridge of the illustrated embodiment, the slide area defining section including the upper and lower casing members of the casing which defines the slide area is provided on the inner surface thereof with at least one thick-walled portion in a manner to extend along over the whole periphery of the portion of the head inserting hole overlapping the sheet-like liner and inwardly project from the inner surface thereof in the form of a frame-like shape of a suitable width. Such construction of the disc cartridge not only permits the sheet-like liner to be pressed against the disc at a force of a constant level over a wide area for extended periods of time but fully prevents entering of a foreign matter such as dust, moisture or the like into the casing by suction due to rotation of the disc in use because the thick-walled portion 28 substantially blocks a communication between an interior of the cartridge and its exterior through the head inserting hole 22. Also, it provides the slide area defining section of the casing with rigidity sufficient to fully prevent any deformation of the portion. This ensures stable and positive operation of the disc cartridge while permitting the liner to constantly exhibit a good cleaning effect and satisfactorily keeping proper contact between a head of a cartridge operating unit and the disc to prevent damage of both sheet-like liner and disc.

Figure 6:
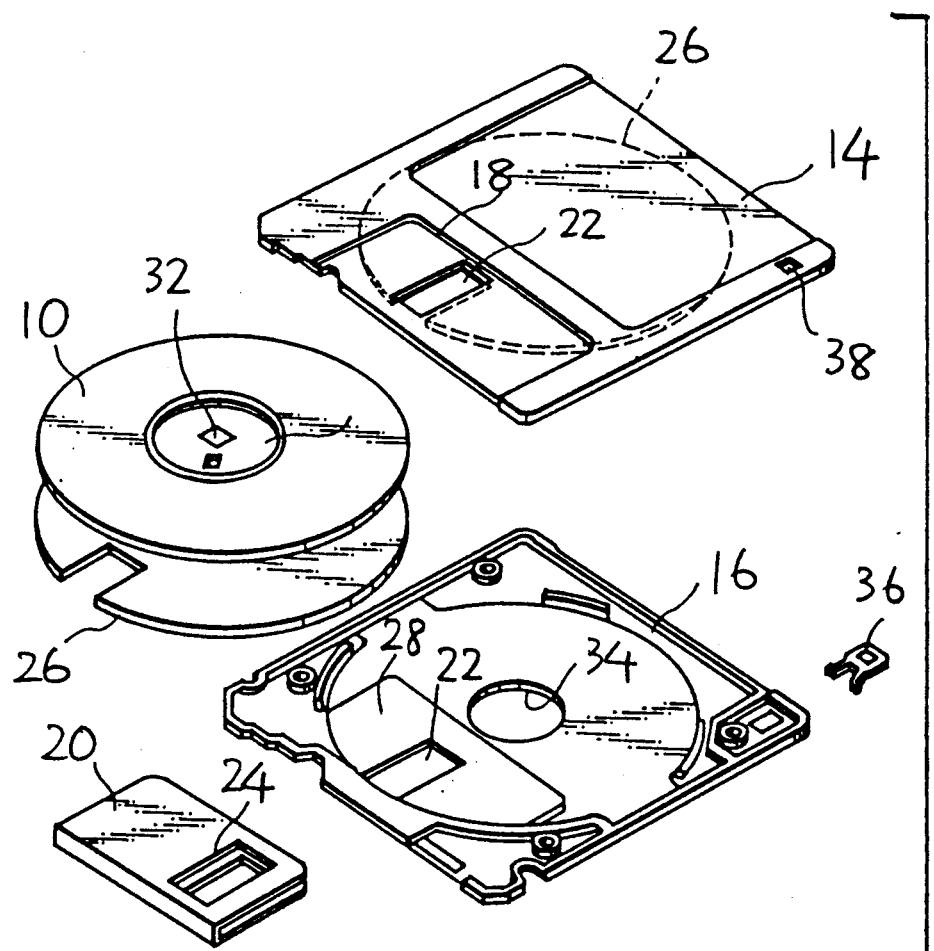
FIG. 6 is an exploded perspective view of another embodiment of a disc cartridge according to the present invention.
Figure 7:
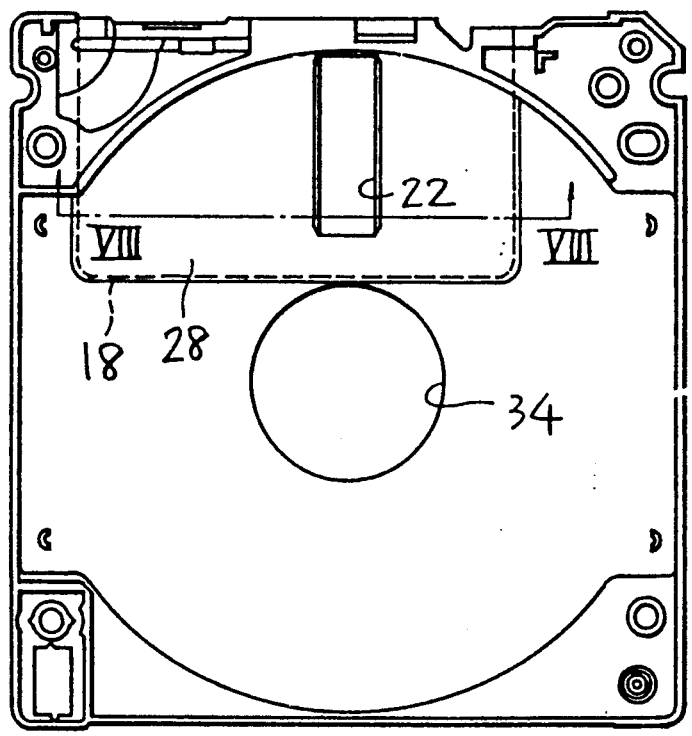
FIG. 7 is a plan view showing a lower casing member of the disc cartridge shown in FIG. 6.
Figure 8:
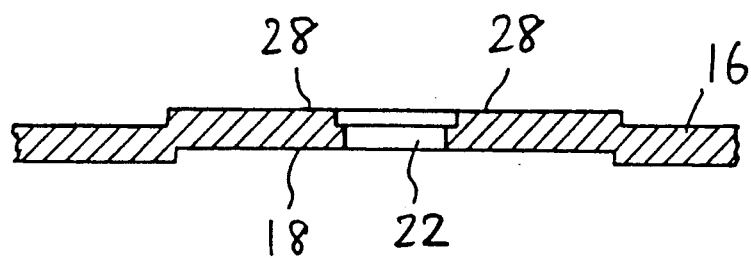
FIG. 8 is a sectional view taken along line VIII—VIII of FIG. 7.

FIGS. 6 to 8 show another embodiment of a disc cartridge according to the present invention. A disc cartridge of FIGS. 6 to 8 is so constructed that a thick-walled portion 28 is provided so as to extend over a substantially whole slide area 18. In the embodiment, the thick-walled portion 28 is arranged on each of upper and lower casing members 14 and 16. Such construction of the embodiment more satisfactory and effectively accomplishes the advantages of the embodiment described above with reference to FIGS. 1 to 5, as well as facilitates manufacturing of the disc cartridge because the thick-walled portion 28 is obtained by merely increasing a thickness of the overall slide area defining section toward in the inward direction.

Thus, it will be noted the present invention ensures that endurance, reliability and safety of the disc cartridge are significantly improved without requiring working with high accuracy. Further, the present invention positively prevents deterioration of formability of the casing, particularly, the slide area defining section and a decrease in rigidity of the casing, even when the shutter is formed into a thick wall.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a manner of language, might be said to fall therebetween.

What is claimed is:

1. A disc cartridge comprising:
   a disc;
   a casing including a circumferential side wall in which said disc is rotatably received;
   a slide area defined on said casing by a slide area defining section of said casing including an upper and lower surface of said casing;
   at least one recording and/or reproducing head inserting hole formed in said slide area, a peripheral edge of said head inserting hole extending radially inward from said circumferential side wall;
   a shutter slidably fitted on said slide area defining section of said casing so as to be slidably over said slide area for covering and uncovering said head inserting hole;
   a liner arranged in said casing in a manner to be interposed between an inner surface of said casing and said disc, said liner having a peripheral edge that substantially conforms to said peripheral edge of said head inserting hole; and
   at least one thick-walled portion projecting inwardly from said inner surface and continuously surrounding said peripheral edge of said head inserting hole, said thick-walled portion having a continuous and substantially flat surface contacting said peripheral edge of said liner, said flat surface pressing said liner against said disc for cleaning and substantially blocking external contaminants from entering said casing between said thick-walled portion and said disc.

2. A disc cartridge as defined in claim 1, wherein said at least one thick-walled portion is formed into a frame-like shape of a predetermined width.

3. A disc cartridge as defined in claim 1 or 2, wherein said at least one thick-walled portion is provided so as to extend in a radial direction of said disc by a distance sufficient to cover a region of said disc between an innermost periphery of a recording section of said disc and an outermost periphery of said disc.

4. A disc cartridge as defined in claim 1, wherein said at least one thick-walled portion is formed in a manner to extend substantially over said slide area.

5. A disc cartridge comprising:
   a disc;
   a casing in which said disc is rotatably received, said casing comprising an upper casing member and a lower casing member joined together to define a space including a circumferential side wall for receiving said disc;
   a slide area defined on said casing by a slide area defining section said casing including a part of said upper casing member and a part of said lower casing member which are interconnected through a side wall of said casing;
   a pair of recording and/or reproducing head inserting holes, a peripheral edge of said head inserting holes extending radially inward from said circumferential side wall;
   a shutter slidably fitted on said slide area defining section of said casing so as to be slidably over said slide area for covering and uncovering said inserting holes;
   a liner arranged in said casing in a manner to be interposed between one of an upper and a lower inner surface of said casing and said disc, said liner having a peripheral edge that substantially conforms to said peripheral edge of said head inserting hole; and
   at least one thick-walled portion projecting inwardly from one of said upper and lower inner surfaces and continuously surrounding said peripheral edge of said head inserting hole, said thick-walled portion having a continuous and substantially flat surface contacting said peripheral edge of said liner, said flat surface pressing said liner against said disc for cleaning and substantially blocking external contaminants from entering said casing between said thick-walled portion and said disc.

* * * * *